United States Patent [19]
Kawanobe et al.

[11] Patent Number: 6,037,727
[45] Date of Patent: Mar. 14, 2000

[54] DEVICE FOR AUTOMATICALLY CONTROLLING THE CLOSURE OF A SLIDING DOOR FOR A VEHICLE

[75] Inventors: Osamu Kawanobe; Ryoji Shimura, both of Yokohama, Japan

[73] Assignee: OHI Seisakusho Co., Ltd., Yokohama, Japan

[21] Appl. No.: 08/911,034

[22] Filed: Aug. 14, 1997

[30] Foreign Application Priority Data

Aug. 19, 1996 [JP] Japan .................................. 8-234668

[51] Int. Cl.[7] ...................................................... H02P 1/00
[52] U.S. Cl. ........................ 318/286; 318/446; 318/466; 318/468; 318/489; 49/31
[58] Field of Search ..................................... 318/280–300, 318/441–489; 49/13, 31, 139–140, 348–349, 360

[56] References Cited

U.S. PATENT DOCUMENTS 4,916,861  4/1990  Schap .......................................... 49/31
5,892,340  4/1999  Sasajima et al. ........................ 318/293

Primary Examiner—David Martin
Attorney, Agent, or Firm—Foley & Lardner

[57] ABSTRACT

A vehicular slide door open-close control apparatus for opening a slide door installed at a side of vehicle body by means of the drive source such as a motor and the like. The purpose of the apparatus is to reduce a burden applied to the slide door moving from its full-open position along its close direction, downsize, lighten and lower the cost. Also, reducing an operational force when the door is manually closed. The control apparatus has a drive source 54 such as motor and the like, a slide door 3 open-close-moved by a slide door open-close mechanism, a clutch means 56 transmitting intermittently a drive force of the drive source 54 to the slide door open-close mechanism, a slope judgement means 76 detecting a vehicle posture and a slide door control means 7 controlling the drive source and clutch means in order to adjust a drive force to be transferred to the slide door open-close mechanism. When a full-open control is done and it is detected that the vehicle parks on a level ground or upward slope, the slide door is stopped just before its full-open position.

4 Claims, 13 Drawing Sheets

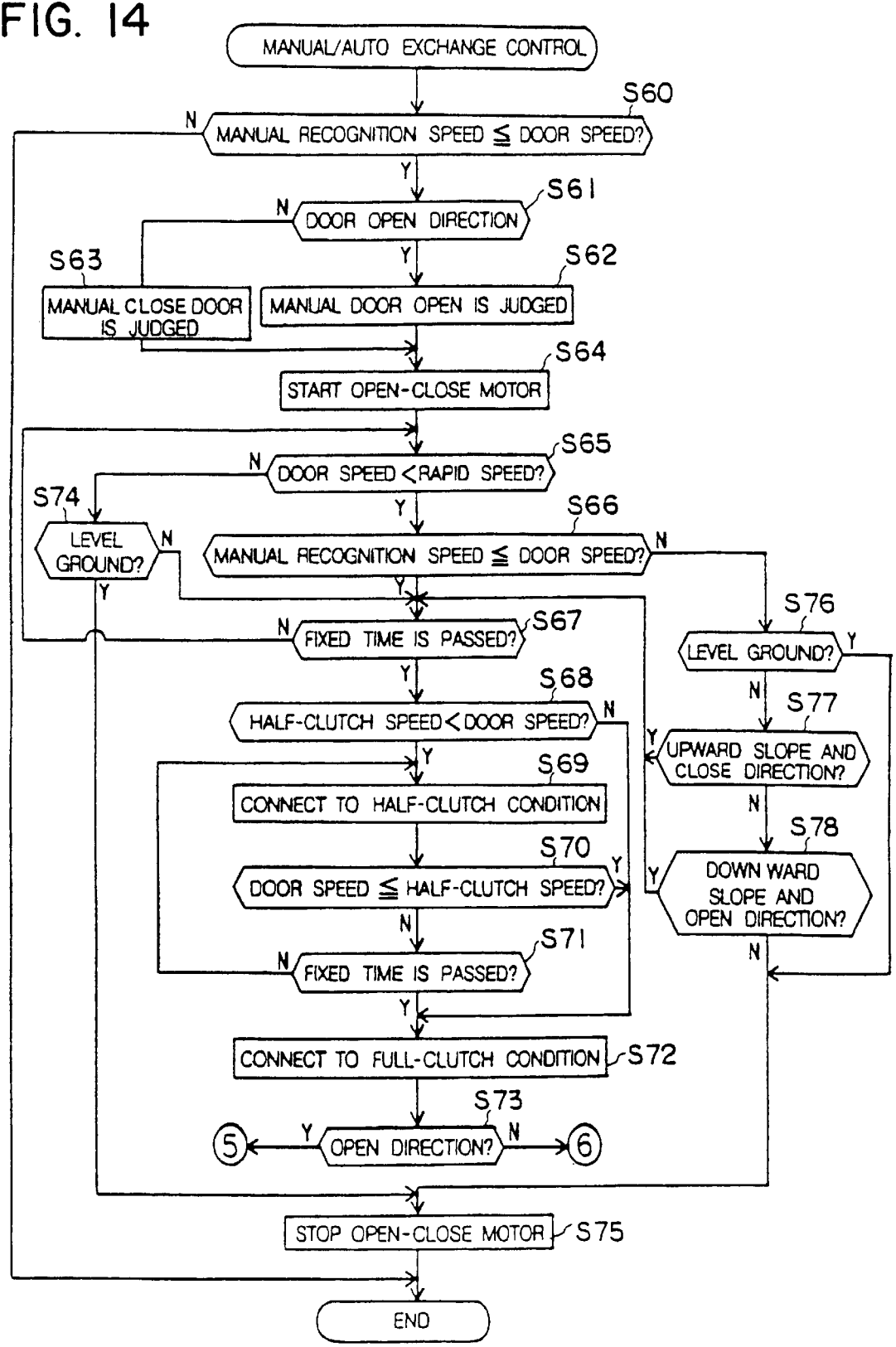

DEVICE FOR AUTOMATICALLY CONTROLLING THE CLOSURE OF A SLIDING DOOR FOR A VEHICLE

BACKGROUND OF THE INVENTION

1. Field of the Invention

This invention relates to an device for automatically controlling the open-close of a vehicular sliding door adapted to be able to automatically open and close the slide door installed on a side of a vehicle body such as an automobile one by means of a drive source such as a motor and the like.

2. Description of the Related Art

Conventionally, an device for automatically controlling the open-close of a vehicular sliding door has been known, which device is adapted to open and close the slide door so supported on a side of a vehicle as to be able to slide along front-rear directions by means of a drive source such as a motor and the like.

According to this conventional device, a user intentionally operates an operation apparatus placed near a driver's seat or a door lever to start the drive source opening and closing the slide door.

By the way, a guide member of the conventional apparatus for slidably guiding a slide door has a full-open check member for mechanically holding the slide door at its full-open position. This full-open check member is constructed by for example a leaf spring and such check member holds the slide door at its full-open position.

However, when the drive force functions its closing operation after the slide door overrides the full-open check member and places at its full-open position, the drive force needs a large force. Although the full-open check member is necessary to hold the slide door at its full-open position, it is necessary only when the vehicle parks on a downward slope in which the slide door is apt to close due to its weight, and it is not necessary when the vehicle parks on a level ground and an upward slope in which its weight of the slide door doesn't close the door.

On the contrary, when the slide door is closed due to the drive source in order to make the slide door override the full-open check member, the drive source needs a high large power. If the slide door is closed by hands, a large operation force is unconveniently necessary to close the slide door.

SUMMARY OF THE INVENTION

This invention thus is invented in order to solve such above-mentioned problem in the prior art. According to this invention, a load necessary when the slide door is operated or runs from its full-open position to its close position can be decreased in order to minituarize the drive source, obtain a light device of a low cost, as well as to make a manual close operation force small.

This invention described in claim 1 above has a drive source such as a motor and the like, a slide door adapted to be open-close movable by means of a slide door open-close mechanism so supported as to be able to open and close along a side of a vehicle, a clutch means for intermittently transferring a drive force of the drive source to the slide door open-close mechanism, a slope judgement means for detecting a stop posture of the vehicle, and a slide door control means for controlling the drive source and the clutch means in order to control the drive force transferred to the slide door open-close mechanism, wherein the slide door control means makes the slide door stop just before its full-open position when the slope judgement means detects that the vehicle is stopped on a level ground or an upward slope when the slide door is full-open controlled.

This invention described in claim 2 above has a drive source such as a motor and the like, a slide door adapted to be open-close movable by means of a slide door open-close mechanism so supported as to be able to open and close along a side of a vehicle, a clutch means for intermittently transferring a drive force of the drive force to the slide door open-close mechanism, and a slide door control means for controlling the drive source and the clutch means in order to control the drive force transferred to the slide door open-close mechanism, wherein the slide door control means makes the slide door stop just before its full-open position when the slide door is full-open controlled, and makes the slide door stop just before its full-open position when it is detected that the vehicle parks on a level ground or an upward slope from a situation in which the slide door moves due to its weight.

This invention described in claim 3 above in accordance with claim 1 or 2 has the slide door control means to make the slide door stop at its full-open position when detecting that the vehicle parks on a downward slope.

According to this invention, a stop posture of the vehicle is detected when the slide door is full-open controlled, the slide door stops just before its full-open position while the vehicle parks on a level ground or an upward slope, and the slide door stops at its full-open position while the vehicle stops on a downward slope. That is, a stop position of the slide door can be selected according to the parking posture of the vehicle.

BRIEF DESCRIPTION OF THE DRAWINGS

FIG. 14 is a flow chart explaining operation of manual/auto exchange control process.

DETAILED DESCRIPTION OF THE PREFERRED EMBODIMENT

Figure 1:
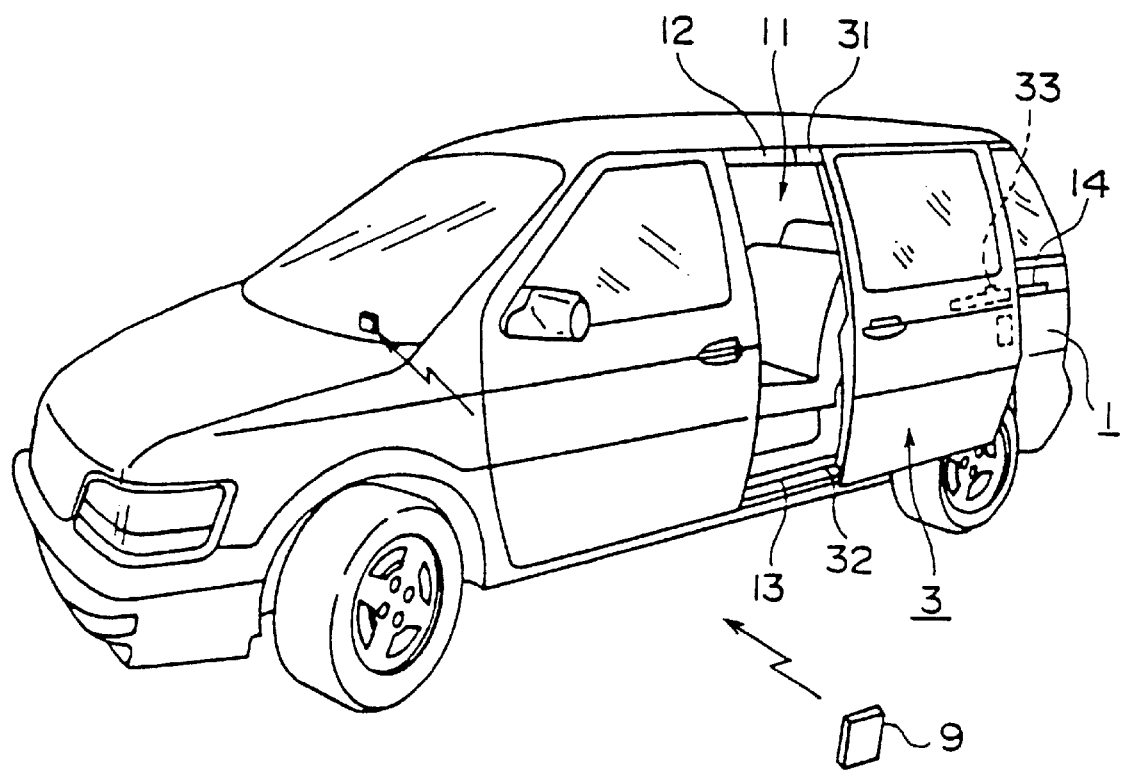
FIG. 1 is an appearance perspective view showing one example of vehicles to which the invention is applied.
Figure 2:
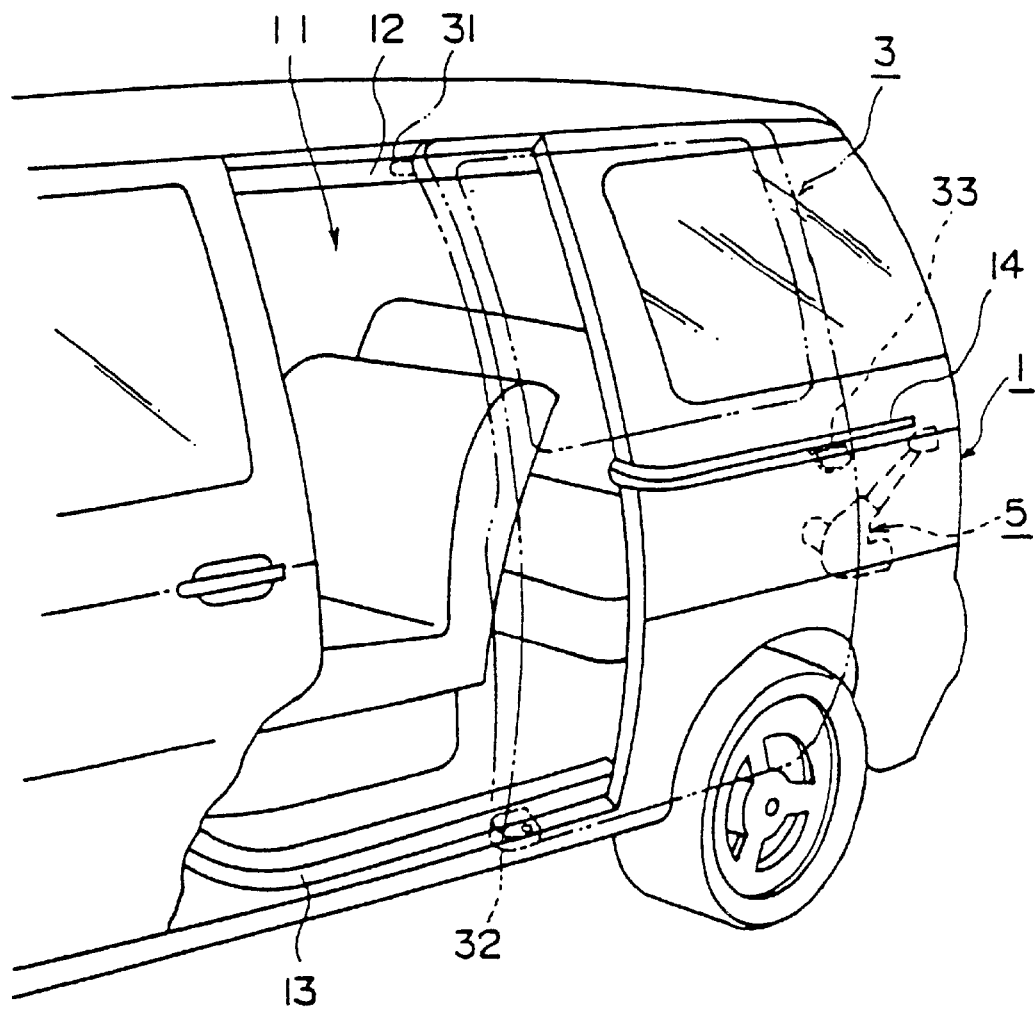
FIG. 2 is an enlarged perspective view showing a vehicle with a slide door removed.
Figure 3:
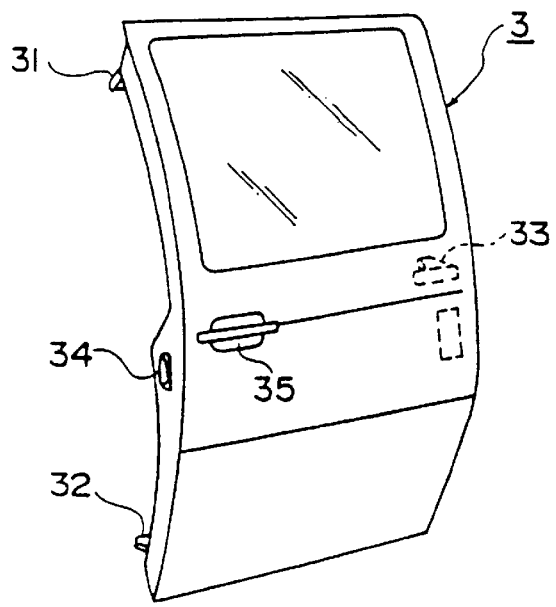
FIG. 3 is a perspective view showing a slide door.

FIG. 1 is an outline perspective view showing one example of the automobiles to which a device for automatically controlling the open-close of a vehicular sliding door according to the invention is applied, also showing a slide door 3 installed at a side of a vehicle body 1 of the automobiles so as to open and close the door along a front and back direction of the vehicle body 1. FIG. 2 is an enlarged perspective view of the vehicle body 1 with the slide door 3 (shown by chained lines) removed and FIG. 3 is a perspective view showing only the slide door 3.

As shown, the slide door 3 hangs-down from the vehicle body 1 so as to slide along the front and back direction by connecting a upper slide connector 31 and a lower slide connector 32, respectively fixed on an inside upper and lower ends of the slide door 3 with an upper track 12 attached to an upper edge of a door opening 11 of the vehicle body 1 and a lower track 13 attached to a lower edge of the door opening 11 of the vehicle body 1.

Still more, the slide door 3 is installed so that a hinge arm 33 attached to an inside rear end slidably engages with a guide track 14 fixed near a rear waist portion of the vehicle body 1 and so it is guided, the slide door 3 moves backwardly in parallel with an outside panel side face of the vehicle body 1 with the door protruding a little from an outside face of an outer panel of the vehicle body 1 from its full-close position sealing the door opening 11 to its full-open position of the door opening 11.

Still more, according to the structure of the slide door 3, when the slide door 3 is positioned at its full-close position, a striker fixed at a side of the vehicle body 1 engages with a door lock 34 installed on an end face of the opening, so that the door 3 is firmly and sealingly held at its full-close position. Furthermore, a door lever 35 is fixed on an outside face of the slide door 3 and it is possible to manually operate the open-close operation.

Figure 4:
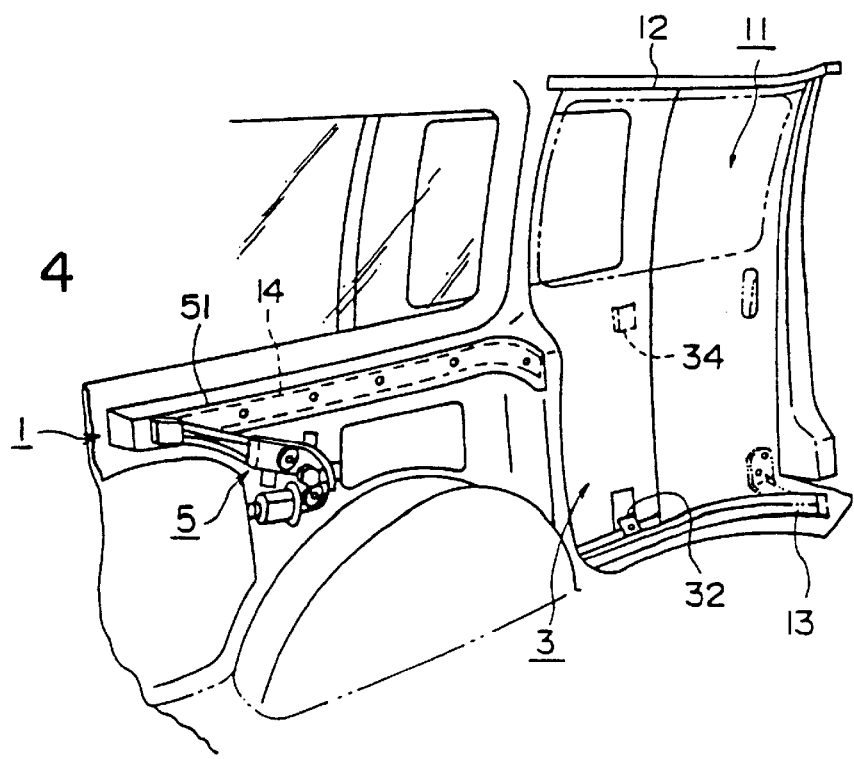
FIG. 4 is a perspective view showing a fixing portion of the slide door seen from a vehicle interior.

Still more, as shown in FIG. 4, a slide door drive apparatus 5 is installed at a rear of the door opening 11 of the vehicle body 1 between an outer panel covering the body 1 and an inner panel of an interior of the body 1. This slide door drive apparatus 5 moves a cable member 51 arranged in the guide track 14 by means of driving the motor, resulting in a movement of the slide door 3 connected to the cable member 51.

Additionally, according to the embodiment of the invention, by an open-close switch placed in the body interior, is instructed the open-close control of the slide door 3, as well as it is possible to be instructed by such orders from the outside of the vehicle body 1 by a wireless remote controller 9 as shown in FIG. 1. A detail of the structure above will be explained later.

Figure 5:
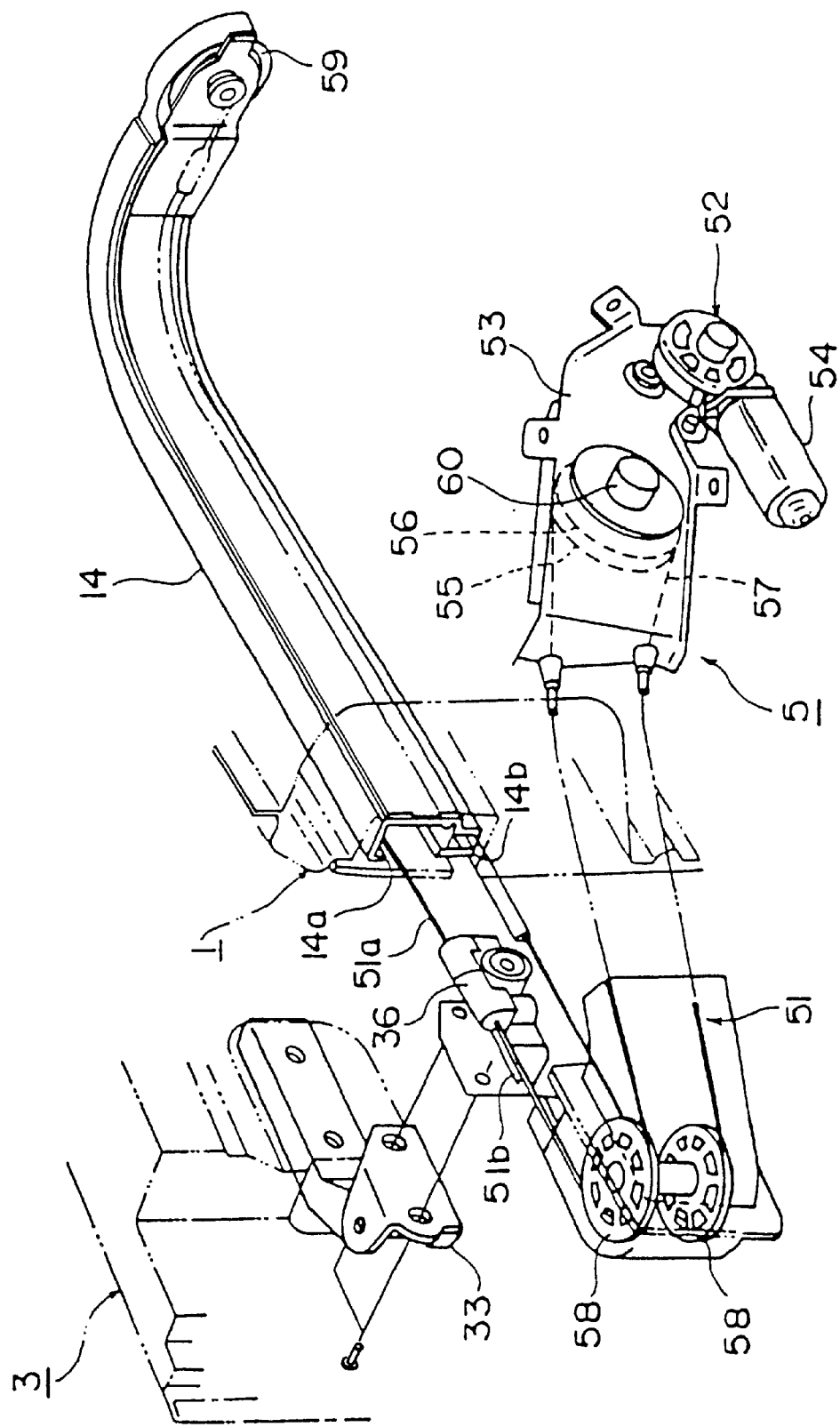
FIG. 5 is a perspective view showing an important portion of slide door drive apparatus.

FIG. 5 is a perspective view showing the important portion of the slide door drive apparatus 5. As shown in FIG. 5, the slide door drive apparatus 5 has a motor drive portion 52. The motor drive portion 52 comprises a reversible open-close motor 54 for opening and closing the slide door 3 on the base plate 53 fixed on an interior side of the vehicle body 1 through bolts and the like, a drive pulley 55 around which the cable member 51 is wound, and a speed reduction portion 57 including an electromagnetic clutch 56.

The drive pulley 55 has a speed reduction mechanism outputting irreversible rotation transmission force, reducing a rotation number of open-close motor 54 and increasing an output torque. The increased torque is transferred to the cable member 51. Also, the electromagnetic clutch 56 is differently and timely magnetized when the open-close motor 54 is driven, resulting in a mechanical connection between the open-close motor 54 and the drive pulley 55.

The cable member 51 wound around the drive pulley 55 runs through a pair of guide pulleys 58,58 each placed at a back of the guide track 14 provided with an open side, in an upper groove portion 14a and an lower groove portion 14b of the guide track 14 provided with an open side, and is wound around a turn-around pulley 59 installed at a front end of the guide track 14. The cable member 51 is endless and these upper and lower groove portions 14a, 14b are placed in parallel.

A moving member 36 adapted to run without any resistance within the groove portion 14a is fixed at an appropriate position of a portion of the cable member 51, which portion is running through the groove portion 14a. The cable member 51 is divided into two parts of door closing one 51a and door opening one 51b. The former part of the cable member 51, the door closing cable 51a, is a front side of the moving member 36 and the latter part, the door opening cable 51b, is a rear side of the moving member 36.

The moving member 36 is connected to an inner rear end of the slide door 3 through the hinge arm 33 and adapted to forwardly or backwardly move through the upper groove portion 14a of the guide track 14 owing to a pulling force of the rotating open-close motor 54 functioning through the door opening cable 51b or door closing cable 51a, resulting in a sliding movement of the slide door 3 in its closing direction or in its opening direction.

A rotary encoder 60 for measuring with a high resolution a rotation angle of a rotary shaft of the drive pulley 55 is connected to the rotary shaft. The rotary encoder 60 outputs signals of pulse number according to a rotation angle of the rotary shaft in order to determine a movement distance of the cable member 51 wound around the drive pulley 55, or a movement distance of the slide door 3.

Therefore, a count N of the pulse number from the rotary encoder 60, from an initial value of the slide door 3 at its full-close position to a final value of the full-open position, means a position of the movement member 36, or a position of slide door 3.

Figure 6:
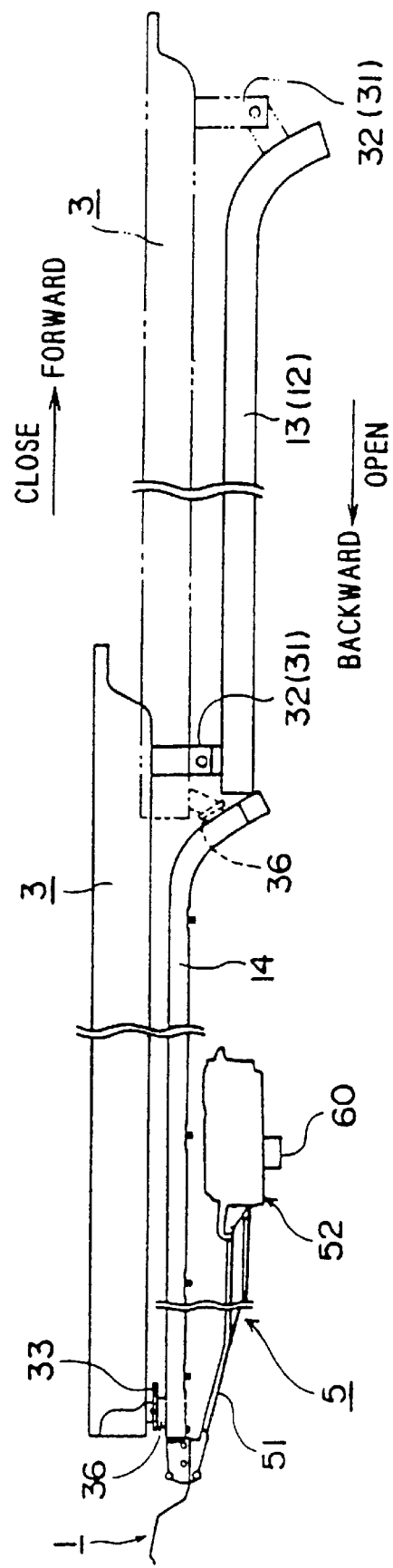
FIG. 6 is a schematic plan view showing a movement situation of slide door.

FIG. 6 is a schematic plan view showing a movement situation of the slide door 3. As described above, a front portion of the slide door 3 is held by connecting the upper slide connector 31 and the lower slide connector 32 to the upper track 12 and the lower track 13. A rear portion of the slide door 3 is held by a fixing of the hinge arm 33 to the cable member 51 through the movement member 36.

Figure 7:
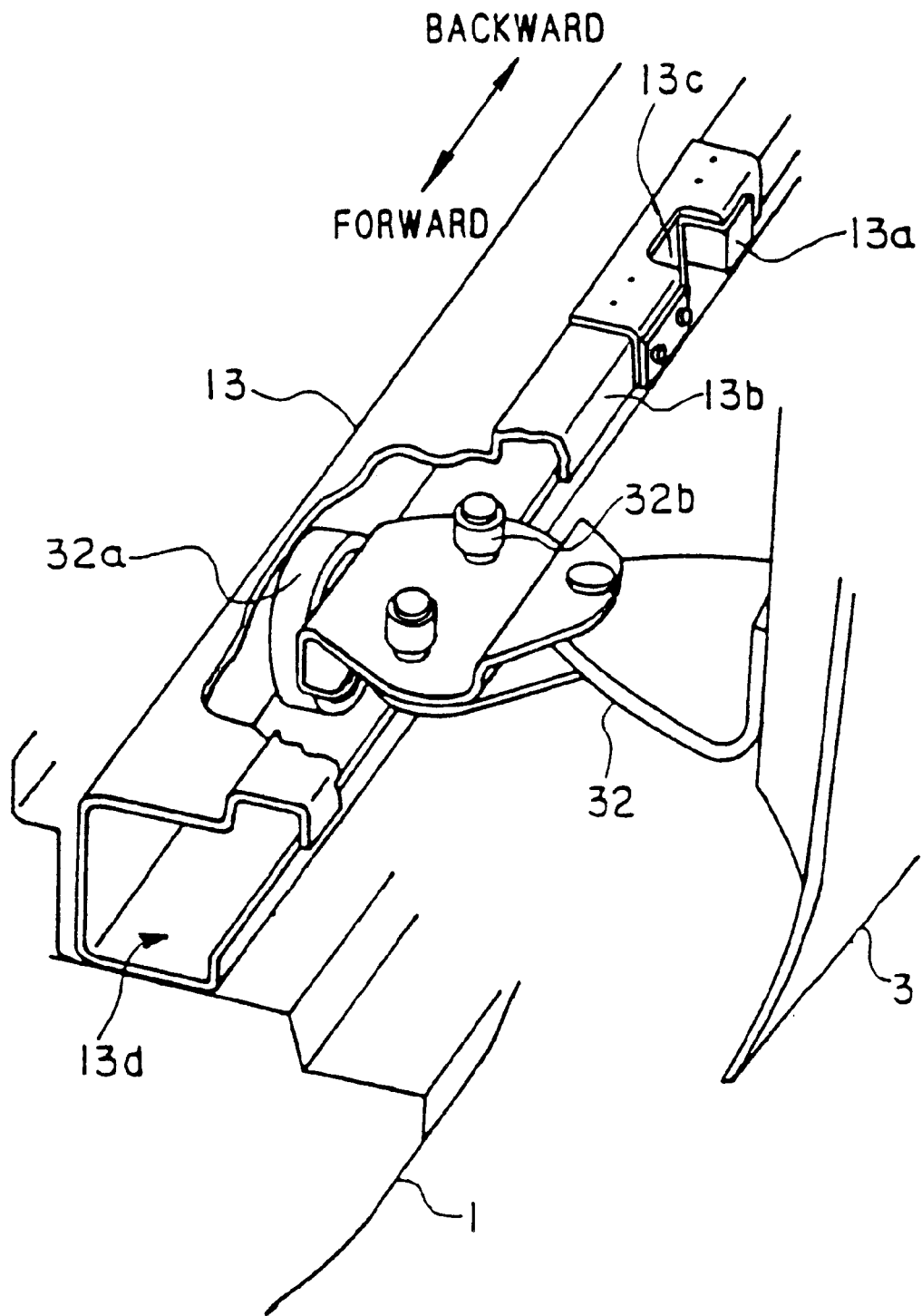
FIG. 7 is an appearance perspective view showing a full open check member installed on lower track.

FIG. 7 is an outline perspective view showing a full-open check member 13a placed on the lower track 13. The full-open check member 13a is made of V-shape leaf spring having a side of steep slope and a side of modest slope. The full-open check member 13a is inserted into a hall portion 13c formed on an upper side end face 13b of the opening of the lower track 13, and is fixed by holding the modest slope side in a manner of cantilever. When the slide door 3 moves backwardly from its position shown in FIG. 7, a vertical roller 32a rotates along a bottom face 13d of the lower track 13 and a horizontal roller 32b rotates with contacting to an inner face of an upper end face 13b. Both rollers 32a, 32b move. When the horizontal roller 32b reaches the full-open check member 13a, the former pushes and overrides the latter outwardly and the former reaches a full-open position. When the horizontal rollers 32b reaches the full-open position, the steep slope side of the full-open check member 13a prevents the horizontal roller 32b from its forward advance, so the slide door 3 is held at its full-open position. Because the steep slope side of the full-open check member 13a has a tilt angle of not so small, a strong operation power makes the horizontal roller 32b push the full-open check member 13a and override the full-open check member 13a and forwardly advance.

Slide Door Control Apparatus

Figure 8:
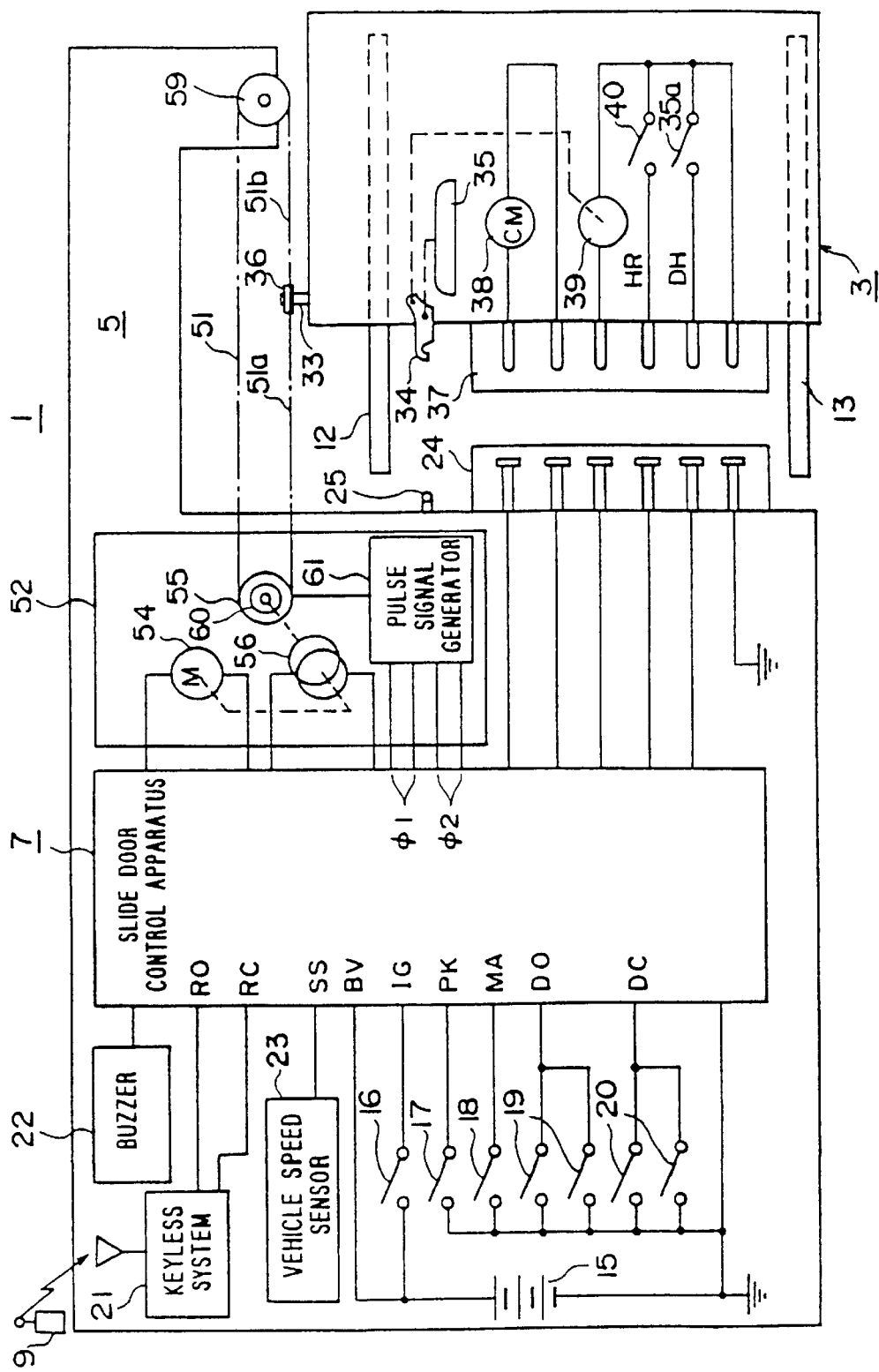
FIG. 8 is a block diagram showing a connection relation between slide door control apparatus and peripheral electric elements.

Next, a connection relation of the slide door control apparatus 7 and various electric elements in the vehicle body 1 and the slide door 3 will be explained with reference to FIG. 8. The slide door control apparatus 7 controls the slide door drive apparatus 5 by means of a computer program of a micro-computer and is placed, for example, near the motor drive portion 52 in the vehicle body 1.

The slide door control apparatus 7 and various electric elements in the vehicle body 1 are connected, such as a battery 15 for receiving DC voltage BV, an ignition switch 16 for receiving ignition signals IG, a parking switch 17 for receiving parking signals PK and a main switch 18 for receiving main switch signals MA.

Still, there are other connections in the slide door control apparatus 7, such as an open door switch 19 for receiving door open signals DO, a close door switch 20 for receiving door close signals DC, a keyless system 21 for receiving remote control open signals RO or remote control close signals RC from a wireless remote controller 9, a buzzer 22 for generating a warning sound warning an automatic open or close operation of the slide door 3 and a vehicle speed sensor 23 for receiving vehicle speed signals SS.

In addition, respective the open door switch 19 and the close door switch 20 consists of two operation devices and a fact shows that these switches are installed at two places of, for example, the driver's seat and the rear seat.

Next, there are connections between the slide door control apparatus 7 and slide door drive apparatus 5, such as one for supplying power to the open-close motor 54, one for controlling the electromagnetic clutch 56 and one for connecting a pulse signal generator 61 to output pulse signals ø1, ø2 for receiving pulse signals from the rotary encoder 60.

Additionally, there is another connection between the slide door control apparatus 7 and various electric elements in the slide door 3 and such connection can be attained by a connection between the vehicle body side connector 24 installed at the door opening portion 11 when the slide door 3 opens a little from its full-close condition, and the door side connector 37 installed at the open end of the slide door 3.

There are connections between various electric element in the slide door 3 and the slide door control apparatus 7 in such connected condition above, such as one for supplying a power to a closure motor CM 38 in order to tighten the slide door 3 at its position just before a half-clutched condition until a full-clutched condition, one for supplying a power to an actuator ACTR 39 in order to release the door lock 34 from the striker 25 by driving the door lock 34, one for receiving half-clutch signals HR from a half-clutch switch 40 detecting the half-clutched conditions and one for receiving door lever signals DH from the door lever switch 35a detecting operation of the door lever 35 connected with the door lock 34.

Next, structure of the slide door control apparatus 7 will be explained with reference to a block diagram of FIG. 9. The slide door control apparatus 7 has a main controller 71 and controls it repeatedly at a fixed interval. The main controller 71 contains a control mode selector 72 for selecting a suitable control mode according to a situation of peripheral circuits.

The control mode selector 72 selects a most suitable exclusive control portion necessary to control the peripheral circuits according to the last situation. The exclusive control portions are an auto-slide control portion 73 for mainly controlling the open-close operation of the slide door 3, a speed control portion 74 for controlling movement speed of the slide door 3 and a pinch control portion 75 for detecting whether something restricting a movement of the slide door 3 is pinched or not along its movement direction during a driving of the slide door 3. The auto-slide control portion 73 contains a slope judgement portion 76 for detecting postures of the vehicle body 1.

Posture detection methods of the vehicle body 1 by the slope judgement portion 76 are one using, for example, an angle sensor and detecting outputs from the angle sensor, and another one detecting voltage value and current value of driving the open-close motor 54 during an open operation of the slide door 3. When a voltage value and a current value of the open-close motor 54 are used, judgements below are employed. When the drive voltage is very low during the slide door 3 being open-driven, it is judged as "steep upward slope". When the drive voltage is low while the slide door 3 being open-driven, judged as "upward slope". In case that the drive voltage is not low and the current value is not large while the slide door 3 being open-driving, it is "level". When the current value is large during the slide door 3 being open-driven, it is judged as "downward slope". When the current value is very large during the slide door being open-driven, it is "steep downward slope".

The slide door control apparatus 7 has a plurality of input/output ports 77, through which ON/OFF signals of various switches above-mentioned and operation/non-operation signals of relays or clutches are input or output.

Figure 10:
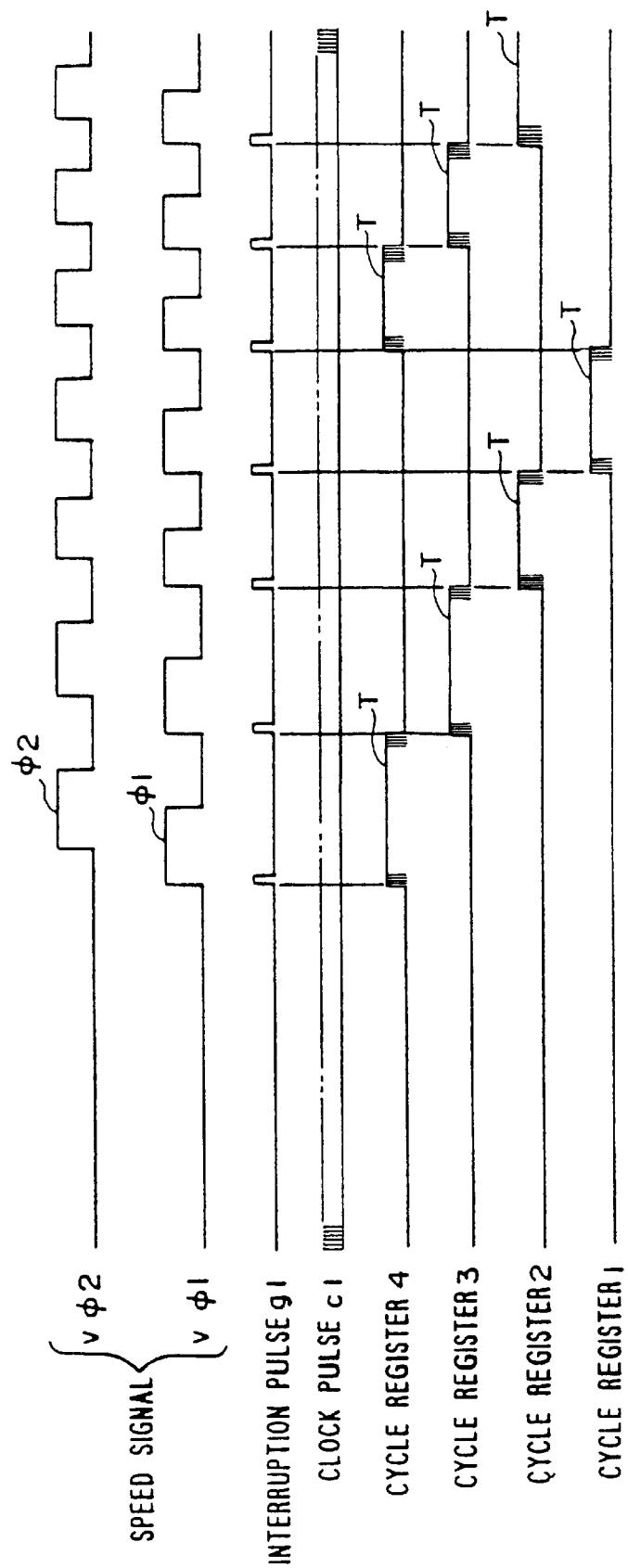
FIG. 10 is a time chart explaining operation of speed calculation portion.

A speed calculator 78 and a position detector 79 receive two-phase pulse signals ø1, ø2 output from the pulse signals generator 61 and generate a periodic count value T and a position count value N. Here, operation of the speed calculator 78 will be explained with reference to a time chart of FIG. 10.

As shown, two-phase speed signals V ø1, V ø2 correspond to two-phase pulse signals ø1, ø2 output from the rotary encoder 60. The rotation direction of the rotary encoder 60, that is, the movement direction of the slide door 3 are detected from the phase relation between both signals of speed and pulse. In concretely, when a pulse signal (2 during starting a pulse signal ø1 is at L level (shown), it is judged that for example it is in an open door direction. When a pulse signals ø2 is at H level, it is judged that opposedly it is in a close door direction.

The speed calculator 78 generates an interruption pulse g1 in starting the speed signals V ø1, and counts pulse numbers of clock pulse C1 having a cycle sufficiently smaller than interruption pulse g1 during a generation period of the interruption pulse g1, the result count value is used as the cycle count value T. Consequently, this cycle count value T is obtained by converting a pulse signals ø1 output from the rotary encoder 60 into its digital value.

According to the embodiment of the invention, a speed of the slide door 3 is recognized by the cycle count value of continuous four cycles of the speed signal V ø1, so that four cycle registers 1 to 4 are employed to store the cycle count value of four cycles. The position count value N can be obtained by counting the speed signals V ø1, that is, the interruption pulse g1.

Figure 9:
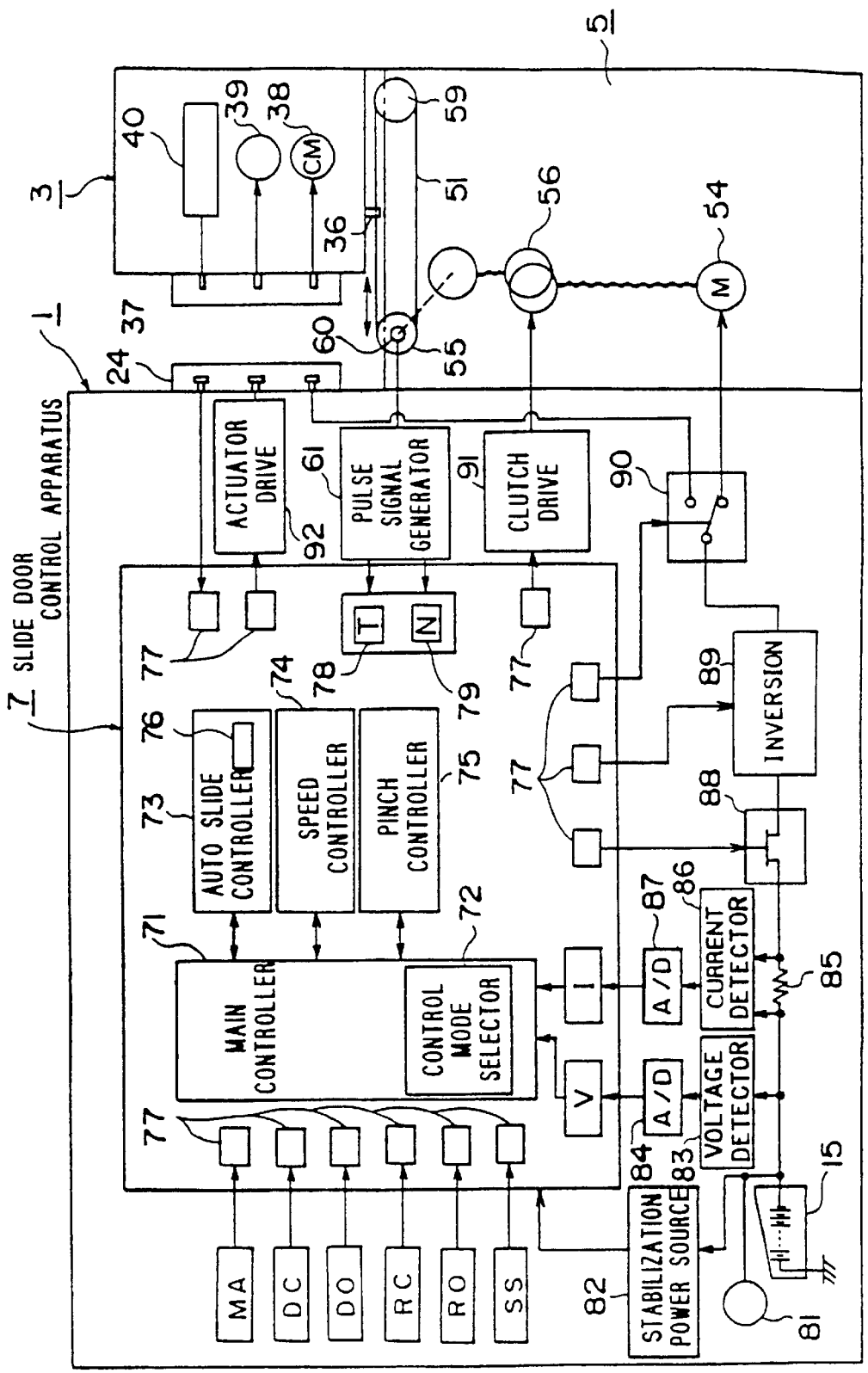
FIG. 9 is a block diagram showing an important portion of slide door control apparatus.

As shown in FIG. 9, a battery 15 is charged by a generator 81 during runnings of the vehicle, and an output voltage of the battery 15 is regular obtaining a constant voltage through a stabililizing power circuit 82 and is supplied to the slide door control apparatus 7.

After output voltage of the battery 15 is detected by a voltage detector 83, this resulting voltage value is converted into digital signal through an A/D converter 84 and is input to a main controller 71 of the slide door control apparatus 7. Also, the output voltage from the battery 15 is supplied to a shunt resistance 85. A current value I flowing through the shunt resistance 85 is detected by a current detector 86. The detected current value I is converted to digital signal through A/D converter 87 and is input to the main controller 71 of the slide door control apparatus 7.

Output voltage of the battery 15 is input to a power switch element 88 through the shunt resistance 85. The power switch element 88 is ON/OFF-controlled by the slide door control apparatus 7 in order to convert DC signal to pulse signal, and the pulse signal is supplied to the open-close motor 54 or the closure motor 38. Duty ration of pulse signal can be adapted to be freely controlled.

Pulse signals obtained by the power switch element 88 are supplied to the open-close motor 54 or the closure motor 38 through an inversion circuit 89 and a motor exchange circuit 90. The inversion circuit 89 is used to change the drive direction of the open-close motor 54 or the closure motor 38, and constructs a power supply circuit for the motor together with the power switch element 88.

The motor exchange circuit 90 selects one of the open-close motor 54 and the closure motor 38 for open-close driving the slide door 3 according to the instructions from the main controller 71. Both these motors 54,38 driving the slide door 3 are not simultaneously driven, so drive power for them is optionally supplied.

Other than that above-mentioned, there are a clutch drive circuit 91 for controlling the electromagnetic clutch 56 according to the instructions from the main controller 71 and an actuator drive circuit 92 for controlling an actuator 39 according to the instructions from the main controller 71, too.

Operation/Auto Open Control

Next, with reference to a flow chart shown in FIGS. 11–14, the open-close automatic control of the slide door 3 according to slide door control apparatus 7 will be explained. Such open-close automatic control process operates only when main switch 18 is ON-condition, the power voltage is supplying to various electric elements together with the slide door control apparatus 7, parking switch 17 is ON-condition and the shift lever is placed at P (park) range, a stop condition of vehicle has been detected by the vehicle speed sensor 23 and a door lock knob is released and the slide door 3 is in open-closable condition. If lacking only one of these conditions or situations above-mentioned, only the manual open-close operation is possible and the open-close automatic control of the slide door control apparatus 7 is not carried out.

Figure 11:
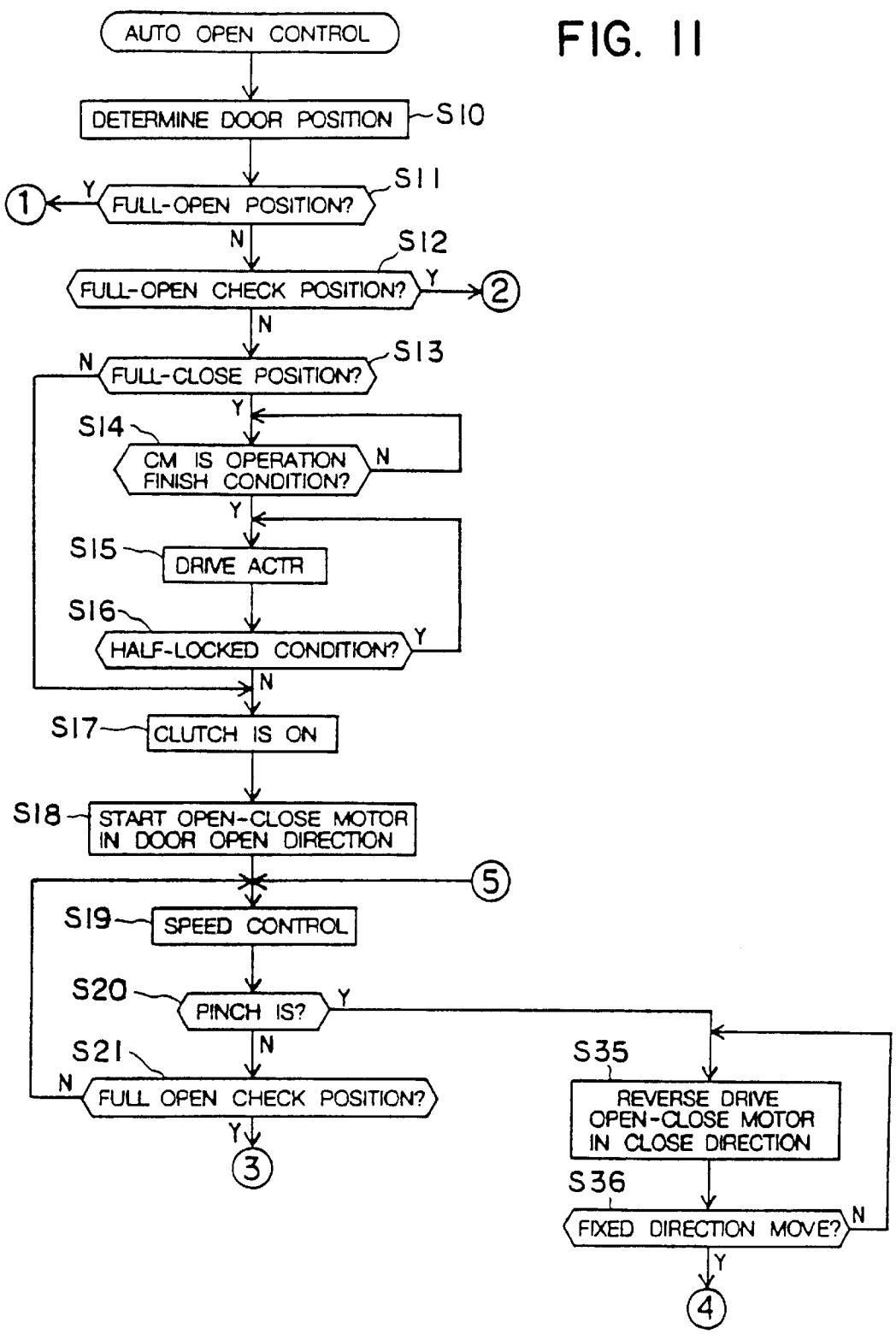
FIG. 11 is a flow chart (1/2) explaining operation of automatic open control process.
Figure 12:
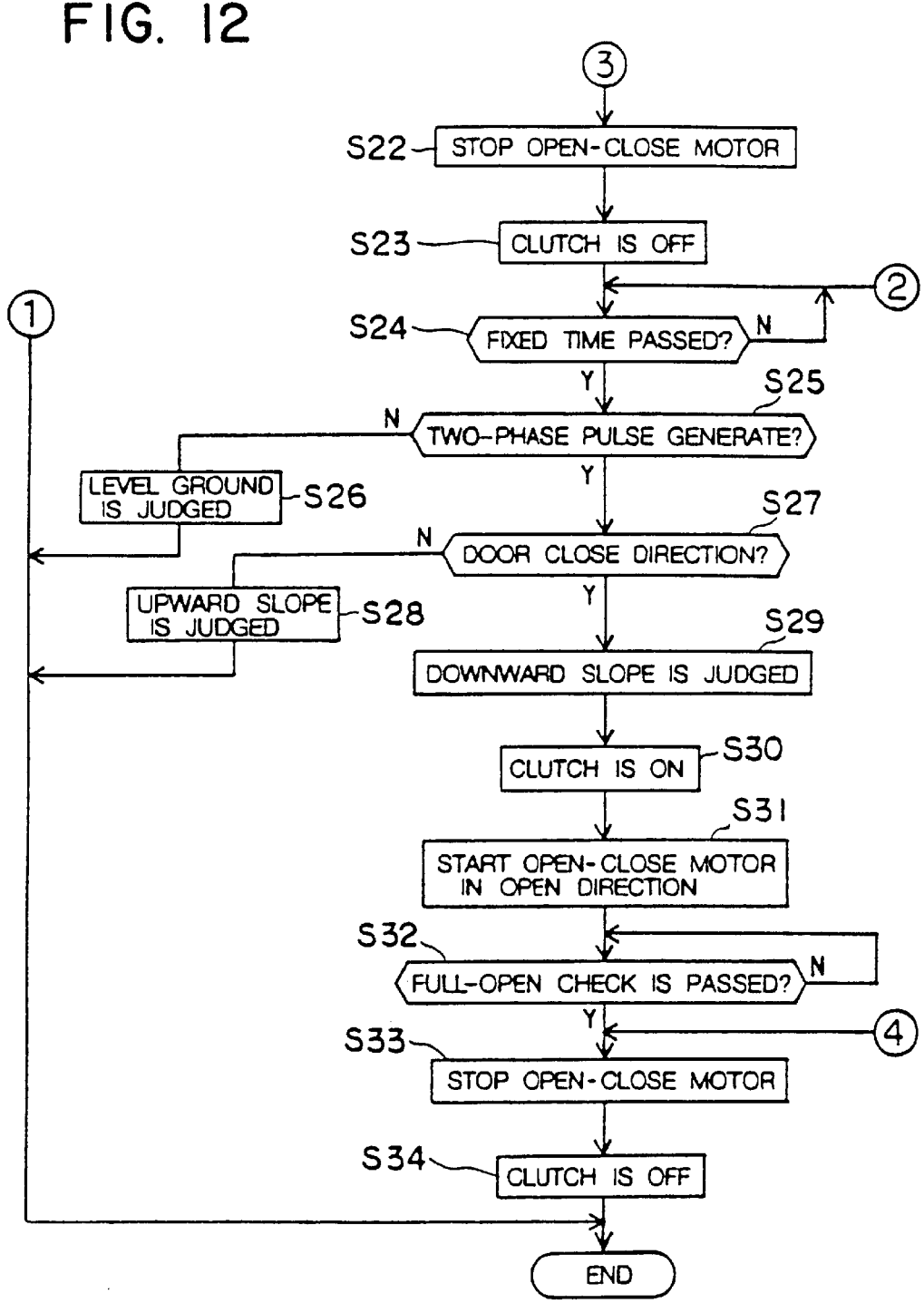
FIG. 12 is a flow chart (2/2) explaining operation of automatic open control process.

First, an automatic open control process ordered by the door open switch 19 installed within the vehicle interior or the wireless remote controller 9 in order to move the slide door 3 to its full-open position will be explained with reference to flow charts shown in FIGS. 11 and 12.

This automatic open control process starts when the slide door control apparatus 7 receives a door open signal DO or a remote open signal RO. First, the present position of the slide door 3 is determined by the position count value N (step S10), and on the basis of the determined position, it is judged whether the slide door is in a full-open position or not (step S11). When it is judged on the basis of the determined position that the slide door 3 is in the full-open position, the automatic open control process is not necessary, so this automatic open control process ends.

When it is judged that the slide door 3 is not in the full-open position in step S11, it is judged whether the slide door 3 is in a full-open check position (just before the full-open check member 13*a*) or not (step S12). When it is judged that it is not in the full-open check position, it is judged whether it is in a full-close position or at a half-lock condition (step S13). In case that it is judged that it is in the full-close position or at the half-lock condition, the closure motor CM 38 is confirmed whether it is at its operation finished condition or not (step S14). When it is judged that it is at its operation finished condition, the actuator ACTR 39 is drived to release the door lock 34 from the striker 25 (step S15). and the half-latch signal HR is confirmed to be OFF-condition of the half switch 40 and it is judged whether the slide door 3 is at its half-lock condition or not (step S16).

When it is judged that the slide door 3 is not in its full-close position in the step S13, or when it is judged that it is not at its half-lock condition in step S16, the clutch drive circuit 91 is controlled so as to make the electromagnetic clutch 56 mechanically connect the open-close motor 54 to the drive pulley 55 (step S17). Then the motor exchange circuit 90 is changed to the side of the open-close motor 54, so that the power switch element 88 and the inversion circuit 89 are controlled to start driving the open-close motor 54 in a door open direction (step S18).

Next, the power switch element 88 is controlled to control the number of rotating the open-close motor 54, so that the speed control of the slide door 3 is operated to move the slide door 3 along its door open direction with a suitable speed (step S19). During such controlling, it is detected whether something restricting a movement of the slide door 3 is pinched or not (step S20). When it is detected that something is not pinched, it is detected whether the slide door 3 reaches its full-open check position which is just before the full-open check member 13*a* or not (step S21). When it is detected that it reaches its full-open check position, the power switch element 88 is controlled to make the open-close motor 54 stop (step S22), and the clutch drive circuit 91 is controlled to release a mechanical connection between the open-close motor 54 and the drive pulley 55 by means of the electromagnetic clutch 56 (step S23).

This condition is held for a predetermined time, that is, it is judged whether a fixed time is passed (step S24). When it is judged that the fixed time is passed, it is judged whether two-phase pulse signal ø1, ø2 are generated or not (step S25). When it is judged that two-phase pulse signal ø1, ø2 are not generated, it is recognized that the vehicle parks on a level ground by a posture of the vehicle (step S26), and this automatic open control process ending. When two-phase pulse signals ø1, ø2 are generated in step S25, it is judged whether the slide door 3 has been moved along its door close direction or not by using a phase relation between these pulse signals (step S27). When it is judged that the slide door 3 has not been moved along its door close direction, that is, when it is judged that the slide door 3 has been moved along its door open direction, it is recognized that the vehicle parks on an upward slope by the posture of vehicle (step S28), and this automatic open control process ending.

When it is judged that the slide door 3 moves along its door close direction in step S27, it is recognized that the vehicle is placed on a downward slope by the posture of vehicle (step S29). In order to prevent the slide door 3 from sliding along its door close direction due to its weight, again the clutch drive circuit 91 is controlled to make the electromagnetic clutch 56 mechanically connect the open-close motor 54 to the drive pulley 55 (step S30), the power switch element 88 and the inversion circuit 89 are controlled to start driving the open-close motor 54 along its door open direction (step S31).

As a result, the slide door 3 again moves along its door open direction. It is judged whether the sliding connector 32 overrides its full-open check member 13a or not (step S32). When it is judged that the sliding connector 32 overrides its full-open check member 13a and passes a full-open check position, the power switch element 88 is controlled to stop driving the open-close motor 54 (step S33). The clutch drive circuit 91 is controlled to release a mechanical connection by the electromagnetic clutch 56 between the open-close motor 54 and the drive pulley 55 (step S34), and this automatic open control process ending.

As described above, stop position of the slide door 3 is controlled by a vehicle posture. That is, when the vehicle parks on a level ground or an upward slope, the slide door 3 stops just before the full-open check member 13a. Therefore, it is not necessary to override the full-open check member 13a, reducing a load burdened on the slide door 3 during a door close operation. On the contrary, when the vehicle parks on a downward slope, the slide door 3 is moved to its full-open position, so that the slide door 3 doesn't close due to its weight.

In addition, according to another judgement method of slopes, the open-close motor 54 is stopped and the electromagnetic clutch 56 is turned OFF instantly, as like in steps 22 to 29, and the door moving direction owing to its weight of the slide door 3 is detected. Also, the detection result of the slope judgement portion 76 mentioned above may be used.

When a pinch is detected in step S20, the inversions circuit 89 is controlled to drive the open-close motor 54 in an opposite direction along its door close direction (step S35), it is judged whether the slide door 3 has been moved at a predetermined (fixed) distance or not (step S36). When it is judged that the slide door 3 has been moved at a predetermined distance, the power switch element 88 is controlled to stop driving the open-close motor 54 in step S33, the clutch drive circuit 91 is controlled to release a mechanical connection by the electromagnetic clutch 56 between the open-close motor 54 and the drive pulley 55 in step S34, and then this automatic open control process ending.

A pinch happening in step S20 is judged by, for example, a relation between a current value I flowing through the open-close motor 54 and a speed signal V ø1, V ø2. That is, when the drive pulley 55 is stopped or its rotation speed is considerably reduced according to a cycle of the speed signal V ø1, V ø2, notwithstanding the current value I detected in the current detector 86 is high and the current is being supplied to the open-close motor 54, it is judged that something for restricting a movement of the slide door 3 is pinched.

The detection of full-open check position in step S21 and the detection of passing the full-open check position in step S32 may be carried out by monitoring a position count value N having its initial value of the full-close position of the slide door 3 or checking an operation of limit switches installed at various positions.

Auto Close Control

Figure 13:
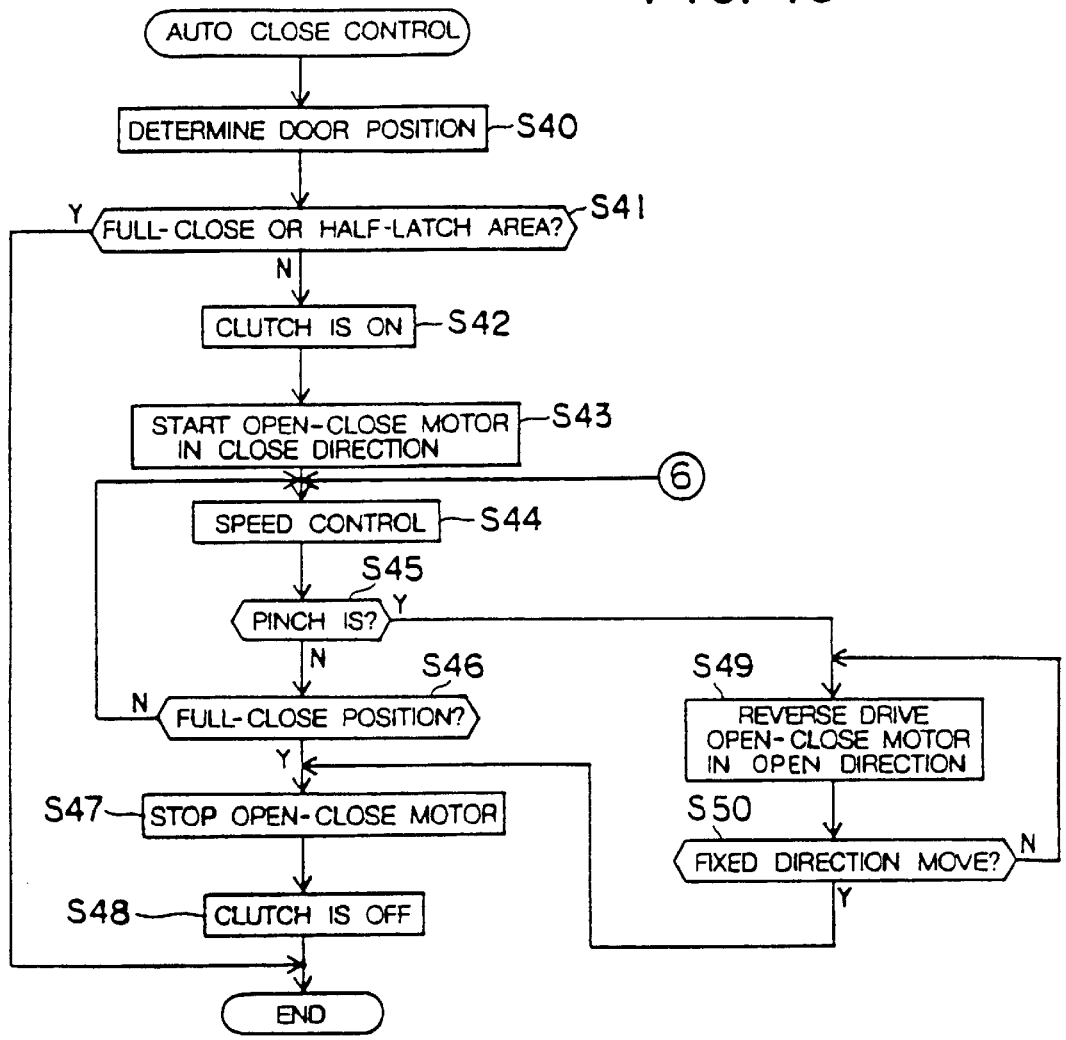
FIG. 13 is a flow chart explaining operation of automatic close control process.

Next, an automatic close control process ordered by the door close switch 20 installed within the vehicle interior or the wireless remote controller 9 in order to move the slide door 3 to its full-close position will be explained with reference to a flow chart shown in FIG. 13.

The automatic close control process starts when the slide door control apparatus 7 receives a door close signal DC or a remote close signal RC. First, the present position of the slide door 3 is determined by the position count value N (step S40). On the basis of the determined position, it is judged whether it is in a full-close position or in a half-clutch region (step S41). When it is judged that it is in the full-close position or in the half-clutch region, this automatic close control process is not necessary, this automatic close control process ending.

When it is judged that it is not in the full-close position or in the half-clutch region in step S41, the clutch drive circuit 91 is controlled to make the electromagnetic clutch 56 mechanically connect the open-close motor 54 to the drive pulley 55 (step S42). From this condition, the power switch element 88, the inversion circuit 89 and the motor exchange circuit 90 are controlled to start driving the open-close motor 54 along its door close direction (step S43).

Next, the power switch element 88 is controlled to adjust a rotation number of the open-close motor 54 in order to carry out a speed control of the slide door 3 moving along its door close direction with a suitable speed (step S44). During such speed control of the slide door 3, it is judged whether something restricting a movement of the slide door 3 has been pinched or not (step S45). When it is judged that something restricting a movement of the slide door 3 has been not pinched, it is judged whether the slide door 3 reaches its full-close position or not (step S46), the power switch element 88 is controlled to make the open-close motor 54 stop (step S47). The clutch drive circuit 91 is controlled to release a mechanical connection by the electromagnetic clutch 56 between the open-close motor 54 and the drive pulley 55 (step S48), this automatic close control process ending.

When it is judged that something restricting a movement of the slide door 3 has been pinched in step S45, the inversion circular 89 is controlled to drive the open-close motor 54 in an opposite direction along its door open direction (step S49), and it is judged whether the slide door 3 has been moved at a predetermined (fixed) distance or not (step S50). When it is judged that the slide door 3 has been moved at the predetermined distance, the power switch element 88 is controlled to stop the open-close motor 54 in step S47, the clutch drive circuit 91 is controlled to release a mechanical connection by the electromagnetic clutch 56 between the open-close motor 54 and the drive pulley 55 in step S48, and this automatic close control process ending.

It is noted that the pinch detection carried out in step S45 is similar to a pinch detection in step 20 mentioned above. In addition, a position detection of the slide door 3 in step S46 is done by monitoring a position count value N having an initial value of its full-close position of the slide door 3.

Manual/Auto Exchange Control

Next, when the slide door control apparatus 7 detects that the slide door 3 manually is moved, it is converted to the automatic open control process or the automatic close control process. Such manual/auto exchange control process below mentioned will be explained with reference to a flow chart shown in FIG. 14. This manual/automatic exchange control process starts when the slide door control apparatus 7 monitors the cycle count value T during stopping the open-close motor 54 and detects that a door moving speed becomes faster than a predetermined manual recognition speed.

First, it is judged that whether a cycle count value T of continuous four cycles stored in the cycle registers 1 to 4 becomes less than the predetermined value or not, that is, whether, in order to prevent false recognition from happening, every door speed in continuous four cycles are faster than the predetermined manual recognition speed or not (step S60). When it is judged that the door speed is not faster than the manual recognition speed, it is recognized that it is not manual door handling, this manual/auto exchange control process ending.

When the door speed is faster than the manual recognition speed in step S60, it is judged whether it is in its open door direction or its close door direction from a positional relation of two-phase speed signals V φ1, Vφ2 (step S61). When it is judged that it is in its open door direction, it is determined that it is at a manual open condition (step S62). When it is judged that it is in its close door direction in step S61, it is determined that it is at a manual close condition (step S63).

Next, basing on the judgement result in step S62 & S63, the power switch element 88, the inversion circuit 89 and the motor exchange circuit 90 are controlled to start driving the open-close motor 54 along door open direction or door close direction (step S64). Here, the electromagnetic clutch 56 is in its OFF-condition, so the open-close motor 54 rotates in idling.

Next, it is judged whether a manual door speed is slower than a predetermined rapid speed or not (step S65). When it is judged that the manual door speed is slower or lower speed, it is again judged whether the door speed is faster than the manual recognition speed or not (step S66). When it is judged that the door speed is faster than the manual recognition speed, these process in steps S65 to S67 are repeated for a fixed time length (step S67). It is because that these steps S65 to S67 above are carried out to confirm a continuation of manual slide door open and close operation.

After passing the fixed time length in step S67, it is judged whether the door speed is faster than a predetermined half-clutch speed (step S68). When it is judged that the door speed is faster, the clutch drive circuit 91 is controlled to make the electromagnetic clutch 56 connect the open-close motor 54 to the drive pulley 55 at a half-clutched condition (step S69). Then, the door speed is come up gradually to the rotation speed of the motor, so it is possible to lighten a shock, which may happen when a full-clutched condition is abruptly gotten while the door speed being fast.

When the door speed lowers less than a half-clutched speed after a predetermined time length (step S70, S71), the clutch drive circuit 91 controls the electromagnetic clutch 56 in order to connect the open-close motor 54 and the drive pulley 55 at a full-clutched condition (step S72). Next, after this process of step S72, it is judged whether the slide door 3 is moved in its open door direction or not (step S73). The process after step S73 is the same as that of the automatic open control process or the automatic close control process, so the process after step S18 (FIG. 11) will be carried out, when it is in its open door direction in step S73, and the process after step S43 (FIG. 13) will be carried out when it is in its close door direction in step S73.

When a manual door speed is faster than a rapid speed in step S65, it is judged whether the ground on which the vehicle parks is a level ground or not (step S74). When the ground is a level, it is necessary to stop driving the open-close motor 54 in order to give a priority to a manual rapid close operation or rapid open operation (step S75), ending this manual/automatic exchange control process.

When it is judged that the ground on which the vehicle parks is not a level in step S74, that is, that the ground is a slope, the process after step S66 are executed to execute the automatic control process in order to prevent the slide door 3 from rapidly moving due to its weight.

When it is judged that the door speed is not faster than the manual recognition speed in step S66, the slope judgement 75 is judged whether the ground on which the vehicle parks is a level or not (step S76). When it is judged that the ground is a level, it is judged a manual operation to be canceled so as to stop driving the open-close motor 54 (step S75), this manual/automatic exchange control process ending.

When, judged that the ground on which the vehicle parks is a slope, the slide door 3 is operated in the upper slope in its door close direction (step S77) or the slide door 3 is operated in the downward slope in its door open direction (step S78), it is judged that the door speed has been lowered due to being operated in opposition to its weight of the slide door 3. Consequently, the process after step S66 will be carried out. When it is judged that the ground is a level in step S76, or when, judged that the ground is a slope, the slide door 3 is not operated in the upward slope in its door close direction in step S77 or it is not operated in the downward slope in its door open direction in step S78, it is judged that the manual operation has been canceled, so making the open-close motor 54 stop (step S75), this manual/automatic exchange control process ending.

Another Embodiment

According to the embodiment mentioned above, only fundamental operation of the slide door 3 was explained. It is possible to stop, while the slide door 3 is moving along its open door direction by, for example, the automatic open control process, the slide door 3 at the position by pushing again the door open switch 19 turning it ON, or to move the slide door 3 along its door close direction from the position by pushing the door close switch 20 turning it ON in order to change the automatic open door control process to the automatic close door control process.

According to this above-mentioned invention, when, the full-open operation of the slide door being controlled by the drive source, the vehicle parks on the level ground or the upward slope, the slide door is adapted to be stopped just before its full-open position, so that it is not necessary to override a full-open check member reducing burden or load of the drive source necessary when the slide door closes. Accordingly, it is possible to minituarize the drive source and to lower its manufacturing cost, and also to reduce a manual force for closing the slide door.

| (Explanation of reference number of parts) | |
|---|---|
| 1 | vehicle body |
| 11 | door opening portion |
| 12 | upper track |
| 13 | lower track |
| 13a | full-open check member |
| 14 | guide track |
| 15 | battery |
| 16 | ignition switch |
| 17 | parking switch |
| 18 | main switch |
| 19 | door open switch |
| 20 | door close switch |
| 21 | keyless system |
| 22 | buzzer |
| 23 | vehicle speed sensor |
| 24 | body side connector |
| 3 | slide door |
| 31 | upper sliding connector |

(Explanation of reference number of parts)

| | |
|---|---|
| 32 | lower sliding connector |
| 33 | hinge arm |
| 34 | door lock |
| 35 | door lever |
| 36 | movement member |
| 37 | door side connector |
| 38 | closure motor (CM) |
| 39 | actuator |
| 40 | half-clutch switch |
| 5 | slide door drive apparatus |
| 51 | cable member |
| 52 | motor drive portion |
| 53 | base plate |
| 54 | open-close motor |
| 55 | drive pulley |
| 56 | electromagnetic clutch |
| 57 | speed reduction portion |
| 58 | guide pulley |
| 59 | turn around pulley |
| 60 | rotary encoder |
| 61 | pulse signal generator |
| 7 | slide door control apparatus |
| 71 | main controller |
| 72 | control mode selector |
| 73 | auto slide controller |
| 74 | speed controller |
| 75 | pinch controller |
| 76 | slope judgement portion |
| 77 | input output port |
| 78 | speed calculator |
| 79 | position detector |
| 88 | power switch element |
| 89 | inversion circuit |
| 90 | motor exchange circuit |
| 91 | clutch drive circuit |
| 92 | actuator drive circuit |
| 9 | wireless remote controller |

We claim:

1. A device for automatically controlling the open-close of a vehicular sliding door comprising:

a drive source, a slide door adapted to be open-close movable by means of a slide door open-close mechanism so supported as to be able to open and close along a side of a vehicle, a clutch means for intermittently transferring a drive force of the drive source to the slide door open-close mechanism, a slope judgement means for detecting a slant of the vehicle and for judging whether or not the vehicle is stopped on a level ground or on an upward slope based on the detected slant, and a slide door control means for controlling the drive source and the clutch means in order to control the drive force transferred to the slide door open-close mechanism, wherein the slide door control means controls the drive source and the clutch means in order to make the slide door stop just before its full-open position when the slope judgement means judges that the vehicle is stopped on a level ground or an upward slope while the slide door is full-open controlled.

2. A device for automatically controlling the open-close of a vehicular sliding door comprising:

a drive source, a slide door adapted to be open-close movable by means of a slide door open-close mechanism so supported as to be able to open and close along a side of a vehicle, a clutch means for intermittently transferring a drive force of the drive source to the slide door open-close mechanism, a vehicular slant judgement means for detecting a direction in which the slide door moves due to its weight, and for detecting a slant of the vehicle based on the detected direction, and for judging whether or not the vehicle is stopped on a level ground or an upward slope based on the detected slant; and a slide door control means for controlling the drive source and the clutch means, in order to control the drive force transferred to the slide door open-close mechanism, wherein the slide door control means controls the clutch means to release its connection between the drive source and the door open-close mechanism when the slide door is just before its full-open position while the slide door is full-open controlled, and controls the drive source and the clutch means in order to make the slide door stop just before its full-open position when the vehicular slant judgement means judges that the vehicle is stopped on a level ground or an upward slope.

3. The device for automatically controlling the open-close of a vehicular sliding door according to claim 1, wherein the slope judgement means has a function for judging whether or not the vehicle is stopped on a downward slope based on the detected slant;

and wherein the slide door control means controls the drive source and the clutch means in order to make the slide door stop at its full-open position when the slope judgement means judges that the vehicle is stopped on a downward slope.

4. The device for automatically controlling the open-close of a vehicular sliding door according to claim 2, wherein the vehicular slant judgement means has a function for judging whether or not the vehicle is stopped on a downward slope based on the detected slant;

and wherein the slide door control means controls the clutch means to connect the drive source and the door open-close mechanism, and controls the drive source and the clutch means in order to make the slide door stop at its full-open position when the vehicular slant judgement means judges that the vehicle is stopped on a downward slope.

* * * * *